United States Patent Office 3,642,702
Patented Feb. 15, 1972

3,642,702
STIBINIC AND STIBONIC CATALYSTS FOR POLYETHYLENE TEREPHTHALATE
John J. Ventura, Eatontown, and Joseph G. Natoli, Old Bridge, N.J., assignors to M & T Chemicals Inc., New York, N.Y.
No Drawing. Filed June 23, 1969, Ser. No. 835,742
Int. Cl. C08g 17/015; C07c 67/00
U.S. Cl. 260—75 R          4 Claims

ABSTRACT OF THE DISCLOSURE

A process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of an antimony compound exhibiting at least one direct bond from carbon to antimony and exhibiting both a double bond from antimony to oxygen or sulfur and, in addition, at least one bond from antimony to a halogen atom or to a hydroxyl group.

This invention relates to an improved method for the preparation of polyethylene terephthalate. More particularly, this invention relates to an improved polycondensation catalyst for use in the manufacture of polyethylene terephthalate exhibiting highly desirably color characteristics, and a high degree of solubility in ethylene glycol said novel catalyst being an antimony compound of the ester in the presence of a catalytic amount of an antimony compound exhibiting at least one direct bond from carbon to antimony and exhibiting both a double bond from antimony to oxygen or sulfur and, in addition, at least one bond from antimony to a halogen atom or to a hydroxyl group.

It is known that polyethylene terephthalate can be prepared from a suitable methyl ester of terephthalic acid formed by initially reacting methyl alcohol with terephthalic acid. When a methyl ester of terephthalic acid is used as a starting material, it is first reacted with ethylene glycol in the presence of a transesterification catalyst by means of an ester interchange reaction. When terephthalic acid, itself, is used as a starting material, it is subjected to a direct esterification reaction with ethylene glycol in the presence of what is generally called the first stage catalytic additive or ether inhibitor. In either method, the resulting reaction product, an ester, is then polycondensed in the presence of a polycondensation catalyst to form polyethylene terephthalate.

Heretofore various materials have been suggested as polycondensation catalysts for polycondensing the ester products of both the transesterification method and the direct esterification method of preparing esters. However, in general, none of the substances that have been suggested as polycondensation catalysts have heretofore proved entirely satisfactory.

It is an object of this invention to prepare polyethylene terephthalate by a direct esterification reaction between terephthalic acid and ethylene glycol or by a transesterification reaction between the methyl ester of terephthalic acid and ethylene glycol to form an ester and the polycondensation of said ester in the presence of a catalyst soluble in ethylene glycol.

This invention is a process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of an antimony compound exhibiting at least one direct bond from carbon to antimony and exhibiting both a double bond from antimony to oxygen or sulfur and, in addition, at least one bond from antimony to a halogen atom or to a hydroxyl group.

The catalysts of this invention satisfy all four of the following criteria:

(1) High rate of reaction.
(2) Polymer color.—The polyethylene terephthalate produced using the catalysts of this invention more than satisfies the most stringent color requirements of the textile trade.
(3) Polymer stability.—An exceedingly low degradation rate is obtained when the polymers produced using the catalysts of this invention are heated in the molten state.
(4) Solubility characteristics.—The novel catalysts of this invention are readily soluble in the reaction mixture and in the polymer.

Apart from the enhancement of the color characteristics and rate of polycondensation by the catalysts of this invention, the thermal stability of the resulting polymers is greatly enhanced since the compounds comprising the catalyst system remain in the polymer. The presence of the catalysts of this invention greatly enhances subsequent processing operations such as the spinning of fibers and the casting of films which operations are carried out from a polymer melt at elevated temperatures.

The antimony compounds of this invention operable as catalysts in the condensation or polymerization of polyethylene terephthalate are those of the formula $Sb(Y_{1-5})_5$ wherein $Y_1$, $Y_2$, $Y_3$, $Y_4$, and $Y_5$ are independently selected from the group consisting of —O, =O, OH, halogen, and R; wherein R is a hydrocarbon such that said compound $Sb(Y_{1-5})_5$ exhibits at least one carbon to antimony bond, at least one double bond from antimony to oxygen or sulfur, and at least one bond from antimony to a halogen atom or to a hydroxyl group.

In this antimony compound, R is a hydrocarbon radical selected from the group consisting of of alkyl, alkenyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, i.e. octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, v-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g. may bear non-reactive substituents such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, v-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substitued alkaryl includes 3-chloro-5-methylphenyl, 2,6-di-tert-butyl-4-chlorophenyl, etc.

Specific antimony compounds operable in the practice of the invention include: phenylstibonic acid, phenyl-p-chlorophenyl stibinic acid, methylstibonic acid, octylstibonic acid, dimethylstibinic acid, dibutylstibinic acid, dioctylstibinic acid, dioctadecylstibinic acid, and diphenylstibinic acid.

The catalysts of this invention are soluble in ethylene glycol in catalytic quantities, i.e. up to about 1% based upon the weight of terephthalic acid and are soluble in ethylene glycol at room temperature. The catalysts of this invention are termed, generally, homogeneous catalysts because their solubility in ethylene glycol provides a homogeneous system as contrasted with a heterogeneous system in which catalysts are not soluble in ethylene glycol.

When terephthalic acid is reacted with ethylene glycol under superatmospheric pressure at temperatures above the normal boiling point of ethylene glycol an esterification product having the desired characteristics for the subsequent polycondensation reaction is obtained. The catalysts of this invention, being hydrolytically stable, may be added prior to the reaction of ethylene glycol with terephthalic acid. The polyesters thus prepared show greatly improved color characteristics, a higher softening point, and a minimum quantity of polyglycol ether units as compared with carrying out the reaction without the catalysts of this invention.

The terephthalic acid ethylene glycol reaction is integrated with the subsequent polycondensation which is carried out at a higher temperature and no ethylene glycol terephthalate esters are actually separated or purified. The integration of the esterification and polycondensation steps has the effect of making the purity of terephthalic acid used in the practice of this invention an important consideration.

The preparation of esters by an ester interchange reaction is generally carried out with a molar ratio of ethylene glycol to dimethyl terephthalate of from about 1:1 to 15:1, respectively, but preferably from about 2:1 to 3:1. The transesterification reaction is generally carried out at atmospheric pressure such as nitrogen, initially at a temperature range of from about 125° C. to 290° C., but preferably around 150° C. to 260° C., in the presence or absence of a transesterification catalyst. During the first stage, methyl alcohol is evolved and is continually removed by distillation. Employing procedures heretofore known in the art, the ester interchange portion of the reaction, or the first step, requires approximately 1 to 4 hours.

Any known suitable transesterification catalyst may be used in the first stage. The transesterification catalyst is used in concentrations from about 0.01% to 0.2% based on the weight of the dimethyl terephthalate used in the initial reaction mixture. Although the novel catalyst combination of this invention is not, itself, an esterification interchange catalyst, it may in general, be added with the esterification interchange catalyst if desired.

The preparation of esters of terephthalic acid and ethylene glycol by direct esterification reaction is generally carried out with a molar ratio of ethylene glycol to terephthalic acid of from about 1:1 to 15:1, preferably about 2:1 to 3:1. The direct esterification reaction is carried out at temperatures ranging from about 260° C. to 300° C. in the absence of an oxygen containing atmosphere at atmospheric or elevated temperatures for about 2 to 3 hours to form the desired ester product. Air is removed, for example, by purging with nitrogen or other oxygen free inert gas. The polycondensation step, or the polymerization of the present invention is effected by adding the antimony compound to bis(2-hydroxyethyl) terephthalate and heating the mixture thereof under reduced pressure within the range of from about 0.001 millimeter to 5 millimeters of mercury while agitating the reaction mass at a temperature from about 250° C. to 300° C. from 1 to 4 hours. In accordance with this invention, the catalysts are generally employed in amounts ranging from about 0.01% to 3.2% based on the weight of the ester to be condensed. Higher or lower concentrations of the novel catalyst mixture of this invention can also be used in the subject polycondensation reaction.

In a continuous process, the solid product of the direct esterification will produce an acceptable fiber and film forming polyester of light color when heated while distilling off unreacted diol at a temperature of from the normal boiling point of the diol up to the temperature at which polycondensation is to be carried out. The temperature at which the unreacted diol is distilled off is not critical but should provide as rapid removal of the diol as can be accomplished without excess foaming and entrainment of foam in the vapors. It is preferred to heat and gradually reduce the pressure so that as the diol is removed the mixture can be heated to polycondensation conditions. It is advantageous to employ an inert oxygen free gas sweep as, for example, by bubbling nitrogen through the mixture while the last portions of unreacted diol are being removed.

For polycondensation the temperature is increased to 260° C. to 300° C. and the pressure is decreased to 0.5 millimeter of mercury or below, preferably 0.3 to 0.1 millimeter of mercury. As polycondensation progresses the mixture becomes increasingy viscous. Hence, the agitation of the viscous mixture should be vigorous to aid in the removal of the diol split out. It is also advantageous to heat thin films of the viscous mixture to permit the rapid diffusion of the diol through the increasingly more viscous liquid. When the polyester reaches the desired viscosity, the polyester can be extruded, quenched and chipped or extruded through spinnerettes or through a die for film forming.

A lighter polyester, such as a white polyester can be prepared by removing the unreacted diol from the hot direct esterification product. This can be done in the same reaction vessel through an attached side-arm condenser or in any separate vessel. It is desirable to keep the hot esterification product in an oxygen free atmosphere while removing water and unreacted diol. As the pressure is reduced to atmospheric or below, the use of an inert gas purge or blanket will adequately provide an oxygen free atmosphere. The diol is removed, preferably at reduced pressure from 100 millimeters of mercury down to 0.5 millimeter of mercury, as rapidly as is possible without causing excessive foaming and withdrawal of the foam.

In applicants' continuous polymerization process the time required to prepare polyethylene terephthalate is substantially less than that required for its preparation by the ester exchange method. The high pressure condensation generally requires about 60 minutes, while the low pressure polymerization is complete in approximately 2 to 3 hours. While applicants' process is particularly useful as a continuously conducted process, the process may be interrupted at any stage and continued later. The process is flexible. While operating conditions dictate a high pressure cycle and a low pressure cycle the condensation and polymerization processes are not, necessarily, individually discrete, i.e. it is not necessary that one stage be complete before the next one is initiated as in processes involving ester exchange.

The following examples illustrate this invention particularly with respect to the preparation of highly polymeric polyethylene terephthalate by starting with bis($\beta$-hydroxyethyl)terephthalate. The catalysts of this invention are also operable in catalyzing the polymerization of other esters of terephthalic acid such as the ethyl, propyl, butyl, and phenyl esters. The polymerization of esters of other organic acid compounds are also catalyzed by the catalysts of this invention. These include esters of adipic acid, butyric acid, sebacic acid, maleic acid, tetrachlorophthalic acid, phthalic acid, cyclohexane carboxylic acid, cyclohexane dicarboxylic acid, benzoic acid, paramethyl benzoic acid, etc. Anhydrides and half esters of these acids may be employed. In the practice of the invention, the term "acid compound" may herein be used to include these anhydrides and half esters as well as the acids. Typical of the anhydrides may be phthalic anhydride, acetic anhydride, maleic anhydride, etc.; typical of the half esters may be, e.g. isooctyl acid phthalate, isooctyl acid maleate, etc.

Polymers prepared in accordance with applicants' invention may be formed by conventional methods of spinning and casting into shaped articles such as films, tapes, fibers, bristles and the like. The polymers can be used in the preparation of ions, woven and non-woven fabrics, papers, leathers, and other structures by methods well known in the art.

The following examples illustrate the present invention and the advantages thereof, it being understood that these are illustrative and not limitative. Unless otherwise indicated, all parts and percentages are by weight.

EXAMPLE 1

This example illustrates the direct process for preparing polyethylene terephthalate from terephthalic acid and ethylene glycol. In the preparation of a high pressure step 20.0 grams of terephthalic acid, 22.0 grams of ethylene glycol, and 0.01 gram of phenylstibonic acid were charged to a stirred autoclave immersed in an oil bath exhibiting a temperature of 235° C. The autogenous pressure in the system was 50 p.s.i. The atmosphere was nitrogen. The oil bath temperature was adjusted incrementally to 280° C. during the 60 minute reaction period. Water formed by the reaction and excess glycol were allowed to be continuously distilled out under atmospheric pressure.

The glycol esters thus formed were polycondensed at 282° C. and under a vacuum of approximately 0.20 millimeter of mercury during a 150 minute time period to give polyethylene terephthalate exhibiting an intrinsic viscosity of 0.57, a white color. The fiber obtained exhibited a good cold stretch.

EXAMPLE 2

The procedure of Example 1 was followed except that the charge to the reactor consisted of 20.0 grams of terephthalic acid, 22.0 grams of ethylene glycol and 0.01 grams of phenyl p-chlorophenylstibinic acid. The temperature of the oil bath during the condensation reaction was initially 245° C. and was increased to 280° C. The autogenous pressure in the system during the glycol condensation was 50 p.s.i. and the polycondensation of ethylene glycol terephthalate was conducted under a vacuum of 0.15 millimeter of mercury at 280° C. for 150 minutes. The polyethylene terephthalate fiber product obtained exhibited an intrinsic viscosity of 0.67, a white color after being ground, and good cold stretch properties.

Although this invention has been illustrated by reference to specific embodiments, modifications thereof which are clearly within the scope of the invention will be apparent to those skilled in the art.

What is claimed is:

1. In a process for preparing fiber- and film-forming polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalyst comprising an effective amount of an antimony compound having a formula selected from the group consisting of

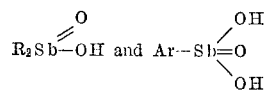

wherein Ar is a monovalent aromatic hydrocarbon radical and wherein R is selected from the group consisting of a monovalent aromatic hydrocarbon radical and a monovalent aliphatic hydrocarbon radical.

2. The process of claim 1 wherein said antimony compound is phenylstibonic acid.

3. The process of claim 1 wherein said antimony compound is phenyl-p-chlorophenylstibinic acid.

4. A process for preparing fiber- and film-forming polyethylene terephthalate directly from terephthalic acid and ethylene glycol comprising heating at a temperature of at least 260° C. and at superatmospheric pressure, terephthalic acid and ethylene glycol in the presence of a catalyst comprising an effective amount of an antimony compound having a formula selected from the group consisting of

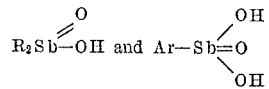

wherein Ar is a monovalent aromatic hydrocarbon radical and wherein R is selected from the group consisting of a monovalent aromatic hydrocarbon radical and a monovalent aliphatic hydrogen radical, reducing said pressure to less than atmospheric pressure while maintaining said temperature of at least 260° C., and recovering polyethylene terephthalate.

References Cited

UNITED STATES PATENTS

| 2,465,319 | 3/1949 | Whinfield et al. | 260—75 |
| 3,329,651 | 7/1967 | Dobinson | 200—75 |
| 3,415,787 | 12/1968 | Carlson et al. | 260—75 |

OTHER REFERENCES

Kirk-Othmer, Encyclopedia of Chemical Technology 2nd ed. vol. 2, p. 581 and title page, pub. 1963. T.P. 9 E68.

WILLIAM H. SHORT, Primary Examiner

L. P. QUAST, Assistant Examiner

U.S. Cl. X.R.

260—475 P